United States Patent [19]
Hayase et al.

[11] 3,826,961
[45] July 30, 1974

[54] DEVICE FOR CONTROLLING SPEED OF DC MOTOR

[75] Inventors: Shunichiro Hayase; Seiya Shima; Takeki Ando, all of Katsuta; Hiroaki Kuroha, Mito; Toshiaki Kurosawa, Katsuta, all of Japan

[73] Assignee: Hitachi, Ltd., Tokyo, Japan

[22] Filed: Sept. 28, 1972

[21] Appl. No.: 293,095

[52] U.S. Cl. ............... 318/308, 318/327, 318/332, 318/345, 318/142
[51] Int. Cl. ............................................. H02p 5/16
[58] Field of Search .......... 318/308, 326, 327, 332, 318/345

[56] References Cited
UNITED STATES PATENTS
3,284,688  11/1966  Black .............................. 318/326
3,458,791  7/1969  Boick .............................. 318/327
3,617,844  11/1971  Grygera .......................... 318/327
3,629,633  12/1971  O'Callaghan ................... 318/326

*Primary Examiner*—Robert K. Schaefer
*Assistant Examiner*—Thomas Langer
*Attorney, Agent, or Firm*—Craig & Antonelli

[57] ABSTRACT

In a speed control system comprising a combination of a dc generator and a dc motor in the Ward-Leonard connection, a tacho-generator connected with the dc motor, a speed pattern generator, and an amplifier for amplifying the deviation of the output of the tacho-generator from the output of the speed pattern generator, the output of the amplifier excites the field winding of the dc generator, the current of the dc motor is detected and positively fed back to the amplifier, and the differential values of the output of the tacho-generator and of the motor current are negatively fed back to the amplifier, respectively.

6 Claims, 8 Drawing Figures

3,826,961

DEVICE FOR CONTROLLING SPEED OF DC MOTOR

The present invention relates to an improvement in a speed control device for use with a dc motor employing Ward-Leonard system, and more particularly to a speed control device used with a motor for elevator driving.

The most important requirements of the control system used in an elevator mechanism are both the comfortable ride and the achievement of negligible level difference. In order to fulfill these requirements, Ward-Leonard system is most widely used for elevator drive.

As is well known, the rotating machine including dc motor, while it is operating, tends to suffer from temperature rise in specific machine parts, which finally varies the operating characteristics of the machine. It is therefore difficult to always obtain comfortable ride in elevator and to stop the driving motor accurately at predetermined angular positions so as to stop the elevator at predetermined levels.

In the conventional elevator system, there is used a control device and especially a rotating machine having a capacity larger than necessary so as to prevent full load operation which will result in temperature rise. For example, as for a dc gearless elevator driven by a dc motor the temperature rise in the armature core is at most about 20°C.

With such an artifice, satisfactory performance can be obtained, but there remains a disadvantage that the used rotating machine is of great size.

In order to reduce the production cost, it is necessary to diminish the size of the rotating machine. However, the reduction of the size is accompanied by the decrease in capacity and therefore by the degradation of the heat dissipation efficiency. As a result, such a small machine of the conventional system can not perform a satisfactory function.

It is therefore the object of the present invention to provide an improved speed control device which can effectively control the speed of a dc rotating machine having rather a small capacity.

The main feature of the invention is the provision of a speed control feedback loop in the Ward-Leonard system, which loop feeds back the first and second differential values of the motor speed to the speed control amplifier.

With this circuit, the control system can compensate for the fluctuation in the characteristic of the rotating machines, i.e. dc motor and generator, due to temperature rise and the reduction of size will therefore be possible.

Other features and advantages of the present invention will be clarified when the following part of the specification is read with the aid of the attached drawings in which.

Figure 1:
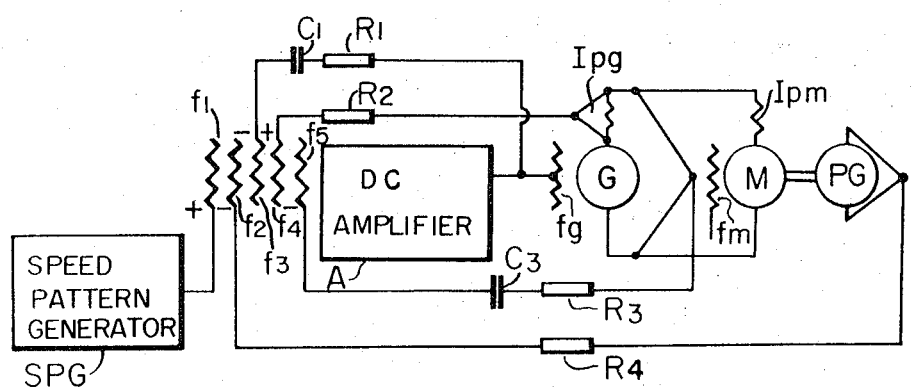
FIG. 1 is an electrical connection diagram of a conventional speed control device used with an electric motor for driving an elevator.

In FIG. 1, a speed pattern generator is designated by SPG; a dc amplifier by A; insulated control windings of the dc amplifier A by $f_1$–$f_5$; a dc generator by G; the field winding of the dc generator G by $f_g$; the interpole winding of the dc generator G by $I_{pg}$; a dc motor by M; the field winding of the dc motor M by $f_m$; the interpole winding of the dc motor M by $I_{pm}$; a tacho-generator by PG; a capacitor and resistor for damping by $C_1$ and $R_1$; an input resistor for compensating for the resistance of the armature winding by $R_2$; a capacitor and resistor for damping by $C_3$ and $R_3$; and a feedback resistor by $R_4$. The plus and minus signs put at the control windings of the dc amplifier A indicate the sense of relevant feedback.

The dc amplifier A which typically comprises an operation amplifier having the separate control windings $f_1$–$f_5$ and a rectifier controlled by output of the operation amplifier, delivers an output which excites the field winding $f_g$ of the generator G. The dc generator G and the dc motor M constitute the Ward-Leonard circuit, and the tachogenerator PG which detects the r.p.m. of the dc motor M and the feedback resistor $R_4$ which feeds the detected output back to the control winding $f_2$ of the dc amplifier A constitute a speed control feedback circuit. Therefore, even if a load is connected to the dc motor M and the rotational speed is changed, the variation in the speed can be reduced by a factor equal to the reciprocal of the loop gain of the control system due to the effect of the speed control feedback circuit. However, the tolerable variation in speed required in the control of the elevator speed is very small and it is quite difficult to satisfy the requirement by merely increasing the loop gain. Therefore, one way of control is proposed according to which the variation in the armature current corresponding to the variation in the load is positively fed back to the dc amplifier A through the resistor $R_2$ so that the speed variation may be reduced to zero even if the load is changed. Moreover, the control system is one using a feedback loop and can not be made stable by the insertion of the resistor $R_4$ alone. An additional damping circuit is needed for stability.

In the conventional control circuit, there is provided in order to obtain stable control negative feedback circuits connected with the control windings $f_3$ and $f_5$ of the dc amplifier A; one consisting of the capacitor $C_1$ and the resistor $R_1$ and the other of the capacitor $C_3$ and $R_3$.

Now, it is required with the speed control system:
(1) that the speed should remain invariable even when the load is statically changed, and
(2) that the transient characteristic of speed should hardly be changed even when the constants of the control elements fluctuate.

The condition (1) can be satisfied by the combined effect of the negative and positive feedback resistors $R_4$ and $R_2$. As for the condition (2), however, the transient characteristic varies depending upon the position of the insertion of the damping elements, i.e. capacitor and resistor. For example, since the generator G is inserted in the loop comprising the damping elements $C_3$ and $R_3$, the speed characteristic of the generator G, even if its constants are varied, will not be easily changed, but since the dc motor M is not inserted in the loop comprising the damping elements $C_3$ and $R_3$, the speed characteristic of the motor M, if its constants are varied, will be considerably changed.

Figure 2:
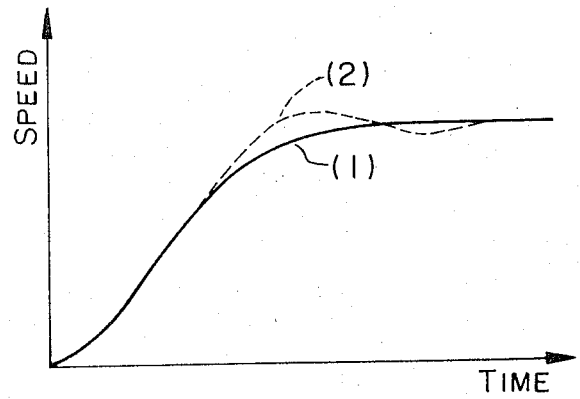
FIG. 2 is a graph showing the relation of the change in the elevator speed with respect to time.

Namely, even if the characteristic of the elevator is initially adjusted so that its speed may follow the curve (1) shown in FIG. 2, an overshoot occurs at the end of the acceleration of the armature of the motor M, as seen from the curve (2) in FIG. 2, on account of the variation in the mechanical time constant of the motor M caused by the increase in the resistance of the armature winding due to the temperature rise in the armature with operating time. Therefore, in the prior art elevator system, there was used a dc machine having a capacity greater than necessary in order for the constants of the dc motor, i.e., armature reaction, resistance of the armature winding and field flux, to by prevented from being easily changed. And this resulted in the disadvantages that the production cost of the machine is increased and that a larger space for installation is needed.

Figure 3:
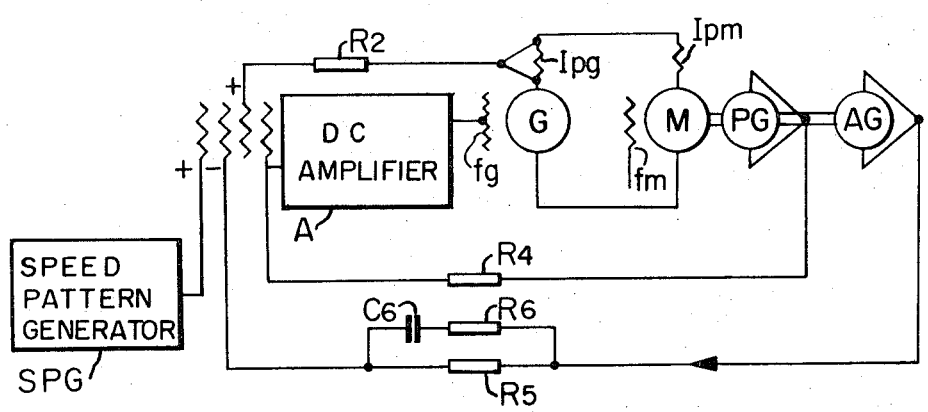
FIG. 3 is an electric connection diagram of a device for controlling the speed of a dc motor, as one embodiment of the present invention.

The present invention employs a novel compensating circuit that prevents the change in the speed characteristic of the elevator even when the circuit constant of the driving motor is varied. FIG. 3 shows the first embodiment of the present invention. According to the circuit shown in FIG. 3, a signal whose intensity is proportional to the armature current is positively fed back so as to prevent the variation in the speed due to the change in the load on the motor, while damping elements whose constants are determined on the basis of the rotational speed of the motor M is inserted in the feedback circuit to obtain stability in control so that the speed characteristic of the elevator may not be changed easily even when the characteristic of the motor M is changed.

Referring to FIG. 3, the same reference characters have been applied to like parts or elements as in FIG. 1. In FIG. 3, an acceleration generator AG, a damping capacitor and resistor $C_6$ and $R_6$, and a resistor $R_5$ are newly introduced elements. The difference from the prior art system (circuit in FIG. 1) is the connection of an acceleration generator AG with the tacho-generator PG, the output of which is negatively fed back to the dc amplifier A so as to obtain stability, the output consisting of the first differential value of the motor speed applied to the amplifier A through the resistor $R_5$ and the second differential value of the motor speed applied through the series connected capacitor $C_6$ and resistor $R_6$ to the same amplifier A. With this circuit, the transient response of the elevator speed, seen from the standpoint of speed instruction, can be determined by the speed control feedback resistor $R_4$ and the feedback elements $R_5$, $R_6$ and $C_6$, but not by the circuit constant of the control apparatus in this circuit. Therefore, although with the conventional circuit the speed characteristic is changed when the constant of the motor M is varied, the speed characteristic will not be varied due to the change in the constant not only of the dc motor M but also of other control elements if the circuit according to the present invention is used. Consequently, the elevator system according to the present invention is comfortable to ride in and never suffers from level difference.

Now, the reason why the motor speed can be controlled irrespective of the circuit constant of the used dc machines through the negative feedback of the first and second differential values of the motor speed, will be briefly explained below.

As is well know, if a control system is constituted of a feedback circuit, the series compensation or the parallel compensation can be used to stabilize the control system. In case of a motor being controlled, larger power will appear in the later stages of the circuit so that the parallel compensation is easier and more economical. Therefore, the parallel compensation is employed in the present invention.

Figure 6:
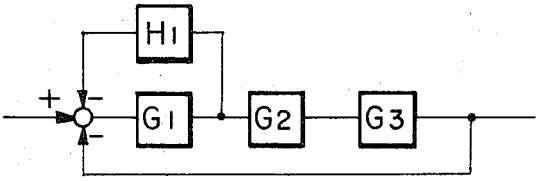
FIGS. 6 to 8 are block diagrams necessary for describing the present invention.
Figure 7:
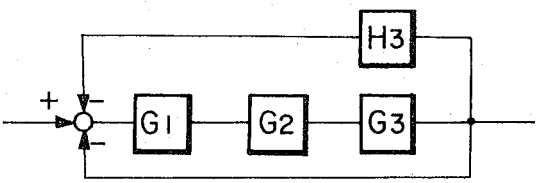
Figure 8:
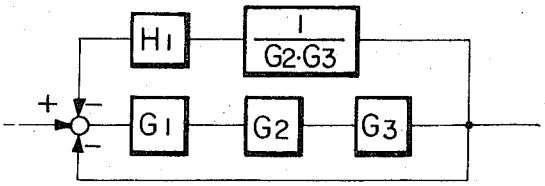

Now, it is assumed that the forward transfer functions of the control system are $G_1$, $G_2$ and $G_3$, respectively. In order to stabilize the control system, two cases of parallel compensations are proposed; one is shown in FIG. 6 wherein $G_1$ is parallel compensated for by $H_1$ (this constitution corresponds to the circuit in FIG. 1) and the other is shown in FIG. 7 wherein $H_3$ is parallel to the series of $G_1$, $G_2$ and $G_3$ (this constitution corresponds to the circuit in FIG. 3). The equivalent transformation of the block diagram of FIG. 6 gives one shown in FIG. 8, and the overall transfer function of the FIG. 8 block diagram will be given by the expression, $$1/1/G_1G_2G_3 + H_1/G_2G_3 \tag{1}$$

On the other hand, the overall transfer function of the FIG. 7 block diagram is given by the expression, $$1/1/G_1G_2G_3 + H_3 \tag{2}$$

If the transient responses of the control systems in FIGS. 6 and 7 are approximately identical with each other, then it follows that $$H_1/G_2G_3 \approx H_3 \tag{3}$$

Now, if it is assumed that $G_1$ experiences a variation due to some cause, then both the transfer functions change in the same manner as seen from the expressions (1) and (2). However, if $G_2$ or $G_3$ undergoes a variation, the expression (2) has the first term of its denominator changed while the expression (1) has both the first and second terms of its denominator changed. It is therefore apparent that the expression (1) has a greater change in value for the same change in $G_2$ or $G_3$ than the expression (2). This means that the effect of feedback circuit is lessened if the transfer functions after the stage of compensating elements ($G_2$ or $G_3$ in this case) is varied. Namely, in the circuit for stabilizing the control system, by applying the parallel compensation to as later a transfer function as possible can be performed the compensation by feedback circuits of the greater change in the control elements.

Figure 4:
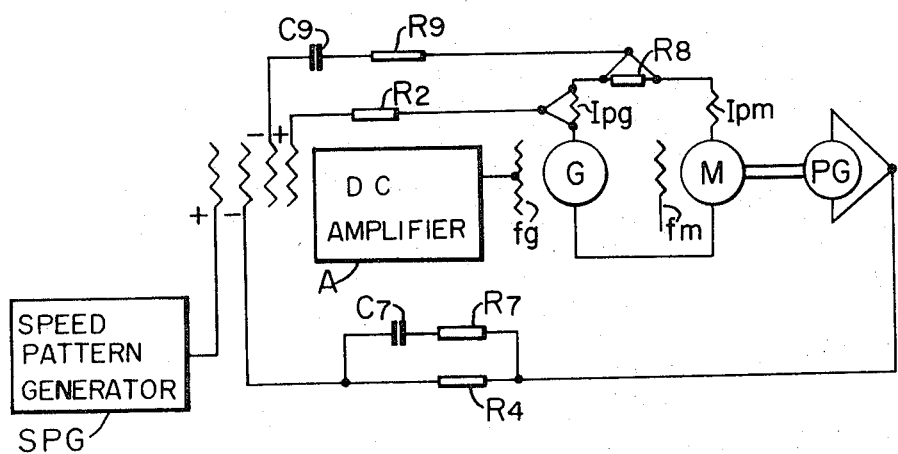
FIG. 4 and FIG. 5 are electric connection diagrams of other embodiments of the present invention.

FIG. 4 shows another embodiment of the present invention, in which an acceleration generator AG is not used and in which the circuit elements identified by the same reference characters as in FIG. 1 are the same as those in FIG. 1. The difference of the circuit shown in FIG. 4 from that shown in FIG. 3 is as follows. Namely, in the circuit in FIG. 3, the output of the acceleration generator AG and its differential component are negatively fed back to the dc amplifier A through the resistor $R_5$ and the damping elements $C_6$ and $R_6$, respectively, but in the circuit in FIG. 4 the resistor $R_5$ of the FIG. 3 circuit is replaced by a differentiating circuit consisting of a capacitor $C_7$ and a resistor $R_7$ and differentiating the output of the tacho-generator PG. Moreover, since the waveform of the armature current is nearly equivalent to that of the accelerating signal, the differentiating circuit constituted of the capacitor $C_6$ and the resistor $R_6$ in the FIG. 3 circuit is replaced by a resistor $R_8$ which detects the armature current and a series combination of a capacitor $C_9$ and $R_9$ constituting a negative feedback circuit. Therefore, the circuits in FIGS. 3 and 4 are equivalent to each other. With this circuit shown in FIG. 4, compensation can be effectively performed when the resistance of the armature of the motor M is varied while the effect of compensation is lessened when the exciting current of the motor M is varied, since in this case the armature current is also varied.

Figure 5:
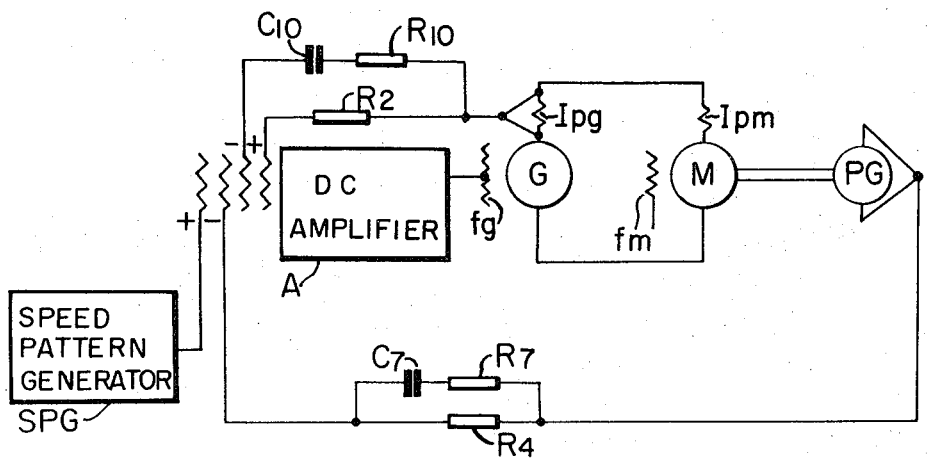

FIG. 5 shows a third embodiment of the present invention, which is simpler in constitution than that shown in FIG. 4. Namely, the terminal of the interpole winding $I_{pg}$ of the generator G is used in place of the resistor $R_8$. With this circuit, however, the resistance of the interpole winding $I_{pg}$ of the generator G changes due to temperature rise and the voltage across the terminals of the winding $I_{pg}$ is varied, so that the quantity of compensation is changed. Consequently, with this circuit shown in FIG. 5, the effect of compensation is lessened when the exciting current or the armature current of the motor is varied. However, this circuit can be successfully used in practice by adding a simple circuit for compensating for the change in resistance due to temperature variation.

It is thus concluded that according to the present invention the static or dynamic change of speed control characteristic of the motor control device due to the variation in any constant of the device can be reduced and that since a motor having an inferior characteristic can also be controlled by the use of the control system according to the present invention, it is needless to employ in the driving system of the elevator a motor having a capacity greater than necessary. For example, in a certain case, whereas the prior art control system requires a motor of 12 tons, the present invention needs a motor of 5 tons for the achievement of the same function.

As described above, according to the present invention, the variations in the different characteristics due to temperature rise etc. can be absorbed by an improved control device and the speed control with high accuracy can be realized even if a motor having a small capacity and an inferior characteristic is used in the driving system, with the result that not only the production cost but the overall size of the device is reduced.

What we claim is:

1. A device for controlling the speed of a dc motor, comprising a dc motor means for providing an instructed speed signal, an amplifier receiving said instructed speed signal, means for feeding back a signal indicative of the speed of said dc motor to said amplifier, said amplifier amplifying the deviation of the magnitude of the fed-back speed signal from that of the instructed speed signal, a dc generator excited according to an output of said amplifier, said dc motor being connected to said dc generator to constitute a Ward-Leonard system, and first compensating means providing output values representative of a first order differential of the speed of said dc motor and a second order differential of the speed of said dc motor and for negatively feeding back the first and second order differential values to said amplifier to compensate for fluctuations in the characteristic of at least one of the dc motor and generator.

2. A device according to claim 1, wherein said first compensating means includes means for simultaneously feeding back the first and second order differential values to said amplifier.

3. A device according to claim 1, further comprising current detector means for detecting the current of said dc motor and second compensating means for positively feeding the output of said detector means back to said amplifier.

4. A device according to claim 1, wherein said first compensating means includes accelerometer means connected with said dc motor so as to provide the first order differential value of the speed of said dc motor and differentiating circuit means for differentiating the output of said accelerometer means to provide the second order differential value of the speed of said dc motor.

5. A device according to claim 1, wherein said first compensating means includes a first combination of a tacho-generator connected with said dc motor and a first differentiating circuit means for differentiating the output of said tacho-generator to provide the first order differential value, and a second combination of a current detector means for detecting the current of said dc motor and a second differentiating circuit means for differentiating the output of said current detector means for providing the second order differential value.

6. A device according to claim 5, wherein said current detector means detects the voltage across the interpole winding of one of said generator and said motor.

* * * * *